(12) United States Patent
Kumar et al.

(10) Patent No.: US 12,238,549 B2
(45) Date of Patent: Feb. 25, 2025

(54) MOBILE TERMINATING DEVICE READINESS

(71) Applicant: T-Mobile Innovations LLC, Overland Park, KS (US)

(72) Inventors: Nitin Kumar, Bothell, WA (US); Frederick Andrew Lien, Bellevue, WA (US); Prakasa Rao Bellam, Snohomish, WA (US); Sumeet Prakash, Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 292 days.

(21) Appl. No.: 17/566,113

(22) Filed: Dec. 30, 2021

(65) Prior Publication Data

US 2023/0217277 A1    Jul. 6, 2023

(51) Int. Cl.
*H04W 24/08* (2009.01)
*H04L 67/55* (2022.01)
*H04W 76/10* (2018.01)

(52) U.S. Cl.
CPC ............. *H04W 24/08* (2013.01); *H04L 67/55* (2022.05); *H04W 76/10* (2018.02)

(58) Field of Classification Search
CPC ........ H04W 24/08; H04W 76/10; H04L 67/55
See application file for complete search history.

(56) References Cited

U.S. PATENT DOCUMENTS

| | | | | |
|---|---|---|---|---|
| 7,826,443 | B1* | 11/2010 | Rahman | H04L 12/66 370/386 |
| 2005/0213564 | A1* | 9/2005 | Nguyen | H04L 43/50 370/352 |
| 2018/0338187 | A1* | 11/2018 | Ketonen | H04L 43/50 |
| 2020/0167270 | A1* | 5/2020 | Yang | G06F 11/3688 |

* cited by examiner

*Primary Examiner* — Luat Phung
(74) *Attorney, Agent, or Firm* — SHOOK, HARDY & BACON L.L.P.

(57) ABSTRACT

Methods and systems are disclosed for implementing a cellular network readiness check between a mobile originator and a mobile terminator for connecting calls and messages. A network communicates push notifications to a device and receives indications of a readiness of that device to participate in a testing scenario. Additionally, within the testing scenario, push notifications are used to communicate expectations of a test communication session to a mobile terminating device and to determine if test outcomes matched expectations.

20 Claims, 4 Drawing Sheets

MOBILE TERMINATING DEVICE READINESS

TECHNICAL FIELD

The present invention relates to implementing a network readiness check between a mobile originating device and a mobile terminating device.

SUMMARY

A high-level overview of various aspects of the present technology is provided in this section to introduce a selection of concepts that are further described in the detailed description section of the present disclosure. This summary is neither intended to identify key or essential features of the claimed subject matter, nor intended to be used as an aid in isolation to determine the scope of the claimed subject matter.

In aspects set forth herein, an automated test system is configured to perform end-to-end cellular network testing. Generally, a cellular network testing involves a sending device and a receiving device, connected by the cellular network. By utilizing the receiving device, the sending and receiving devices may share test expectations to determine a complete end-to-end success or failure. Before beginning a test, the automated test system determines device readiness of a mobile terminating (MT) device by exchanging readiness messages. Within a testing environment, the MT device is made aware of the test in progress by receiving an expectation from a mobile originating (MO) device, in order to determine if the test has been completed correctly. The MO and MT devices in a functional end-to-end test framework communicates by exchanging test expectations and test results and provides a test platform capable of validating and logging complete end-to-end phone calls and text message transfers.

BRIEF DESCRIPTION OF THE DRAWINGS

The present technology is described in detail herein with reference to the drawing figures, which are intended to be exemplary and non-limiting in nature, wherein.

DETAILED DESCRIPTION

Figure 1:
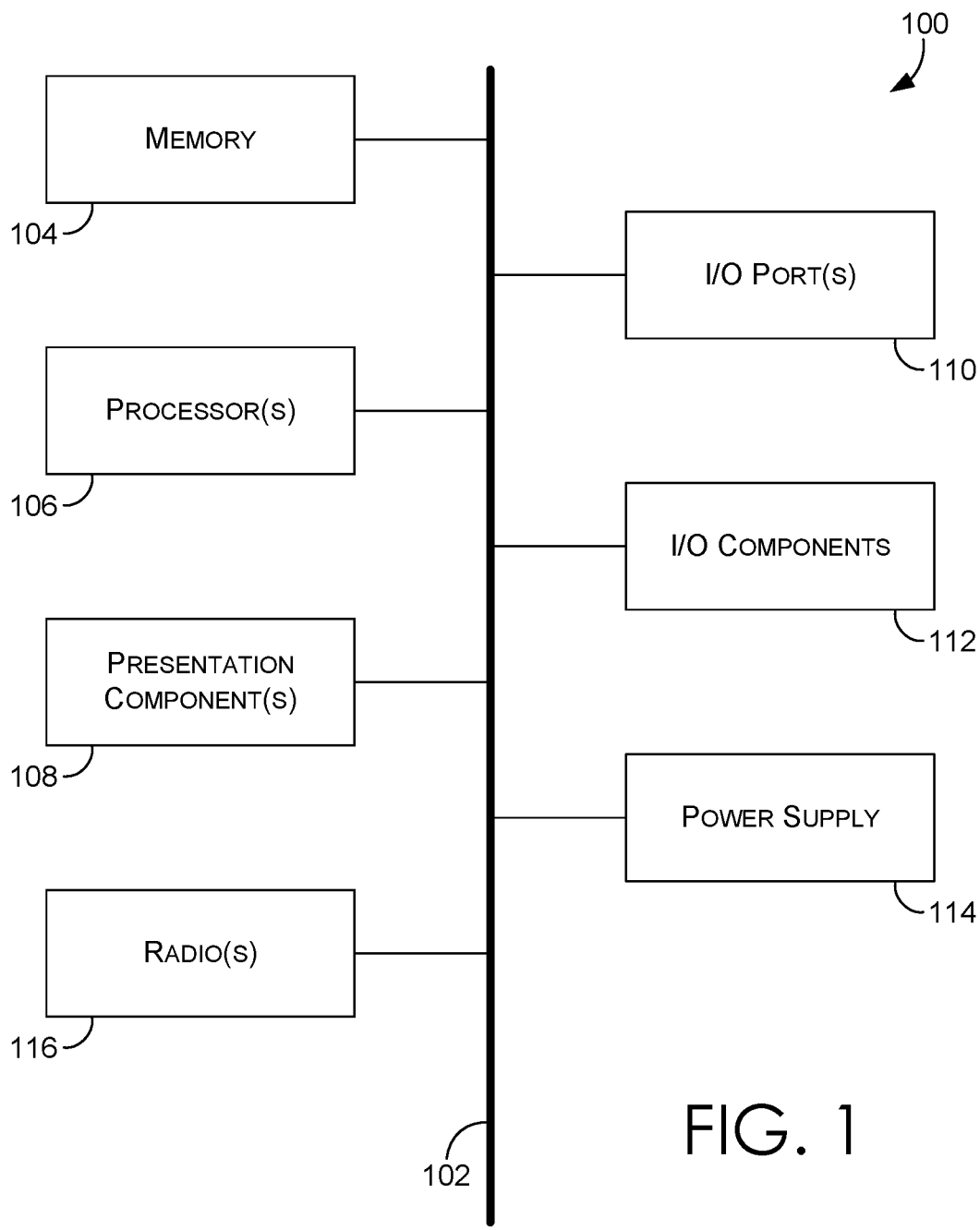
FIG. 1 illustrates an exemplary computing environment suitable for use in implementation of the present disclosure.

The subject matter of embodiments of the present disclosure is described with specificity herein to meet statutory requirements. However, the description itself is not intended to limit the scope of the present disclosure. Rather, the inventors have contemplated that the claimed subject matter might be embodied in other ways, to include different steps or combinations of steps similar to those described in the present disclosure, in conjunction with other present or future technologies. Moreover, although the terms "step" and/or "block" may be used herein to connote different elements of methods employed, the terms recited herein should not be interpreted to imply any particular order among or between various steps herein disclosed unless and except when an order of individual steps is explicitly described.

Throughout the present disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Further, various technical terms are used throughout the present disclosure. An illustrative resource that describes these terms may be found in, for example, Newton's Telecom Dictionary by H. Newton, 31st Edition (2018).

A "mobile device," as used herein, is a device that has a capability of using a wireless communications network, and may also be referred to as a "user device," a "wireless communication device," or a "user equipment (UE)." The mobile device may be embodied as, but not limited to, a personal computer (PC), a laptop computer, a tablet, a mobile phone, a personal digital assistant (PDA), a server, or any other device that is capable of communicating with other devices using the wireless communications network. Additionally, embodiments of the present disclosure may be used with different technologies or standards, including, but not limited to, code-division multiple access (CDMA), internet exchange architecture (IXA), general packet radio service (GPRS), evolution-data optimized (EV-DO), time-division multiple access (TDMA), global system for mobile communications (GSM), worldwide interoperability for microwave access (WiMax) technology, long term evolution (LTE), and/or LTE advanced, among other technologies and standards.

Embodiments of the present disclosure may be implemented as, among other things, a method, a system, and/or a computer-program product. Accordingly, the embodiments include a hardware embodiment, or an embodiment combining a software and a hardware. In one embodiment, the present disclosure includes the computer-program product that includes computer-useable instructions embodied on one or more computer-readable media.

A computer-readable media may include both volatile and non-volatile media, removable and non-removable media, and contemplates media readable by a database, a switch, and/or various other network devices. Network switches, routers, and related components are conventional in nature, as are methods of communicating with the same. By way of non-limiting example, the computer-readable media may include computer storage media and/or communications media.

The computer storage media, or machine-readable media, may include media implemented in any method or technology for storing information. Examples of stored information include computer-useable instructions, data structures, program modules, and other data representations. The computer storage media may include, but is not limited to, random access memory (RAM), read only memory (ROM), electronically erasable programmable read-only memory (EEPROM), flash memory or other memory technology, compact disc read-only memory (CD-ROM), digital versatile discs (DVD), holographic media or other optical disc storage, magnetic cassettes, magnetic tape, magnetic disk storage, and other storage devices. These memory components may store data momentarily, temporarily, and/or permanently. The computer storage media does not encompass a transitory signal in embodiments of the present disclosure. The computer storage media does not include a propagated data signal The communications media typically stores computer-useable instructions including data structures and program modules in a modulated data signal. The term "modulated data signal" refers to a propagated signal that has one or more of its characteristics set or changed to encode information in the signal. The communications media includes any information-delivery media. By way of non-limiting example, the communications media may include wired media, such as a wired network or a direct-wired connection; and wireless media, such as acoustic, infrared, radio, microwave, spread-spectrum, and other wireless media technologies. Combinations of the above are included within the scope of computer-readable media. The communications media do not include signals per se.

In brief, and at a high level, the present disclosure describes, among other things, methods and systems for an automated test system to perform end-to-end cellular network testing. The automated test system provides a way to test creation of phone calls, send text messages, create conference calls, add/remove participants, and initiate call transfers. Each of these scenarios require a sending device and a receiving device, both connected to a cellular network. By utilizing the receiving device, the sending and receiving devices may share test expectations to determine a complete end-to-end success or failure. Before beginning a test case, the automated test system determines device readiness of the cell phone devices by exchanging readiness messages.

In order to validate a voice call or a text message, a functional testing platform requires a confederate recipient on a receiving end of the voice call or the text message. A mobile terminating device (MT) is made aware of the test in progress by receiving an expectation from a mobile originating device (MO), in order to determine if the test has completed correctly. The MO needs to know which MTs are online and available to run the test case. Additionally, during the test case, the MO and MTs utilize a push notification testing platform to communicate an expected and actual results of the test case.

The MO and MT in a functional end-to-end test framework communicate by exchanging the test expectations and test results, and provides a test platform capable of validating and logging complete end-to-end phone calls and text message transfers. The functional end-to-end test framework utilizes a cellular network which allows a browser application to make cellular phone calls and send text messages. In some aspects, instead of using actual cell phones to run the test, by using the automated test system, the automated test system may modify a client on each end of the test scenario and may co-ordinate scenario success validation. The MO and the MTs are able to exchange out-of-band test scenario descriptions, called the test expectations, and use a test case correlator to co-ordinate logging for an executive dashboard and an engineering validation.

The functional end-to-end test framework described herein, has found a unique way to use a push notification service to provide two-way communications in an uncontrolled internet environment, outside the confines and safety of company firewalls. The MO is designed to read a set of test cases from a database, place them in a queue, and execute them one at a time. After reading the test scenario, a test engine of the MO selects the test case and notifies the MTs with an expectation of the results of the test case. The MO and MTs subscribe to the push notification service when they first start up. Using the push notification service, the functional end-to-end test framework creates a two-way communication channel between the MO and all MTs. The push notification service is used to validate a status of the MTs. The test expectations are communicated with the MTs over the push-notification service. Once the expected results of the test case are notified, each involved MT sets a timer for the test scenario. After an appropriate predetermined time period, if an expected test scenario is not received (or if the MT receives the expected test scenario within the predetermined time period), the MT logs the results with the MO.

In one exemplary embodiment of the present disclosure, a system for implementing a cellular network readiness check is provided. The system may include one or more computer components configured to communicate a first push notification from a push notification server to a first mobile terminating device in response to a request to determine a status of the first mobile terminating device; and receive a network connection status from the first mobile terminating device, where the network connection status indicates a readiness of the first mobile terminating device to receive a communication from a first mobile originating device. The one or more computer components is further configured to communicate a second push notification from the push notification server in response to a first request to distribute a message expectation push to the first mobile terminating device. The one or more computer components is further configured to receive an indication from the first mobile originating device to initiate a first communication session with the first mobile terminating device and initiate the first communication session from the first mobile originating device to the first mobile terminating device. The one or more computer components is also configured to receive a communication from the first mobile terminating device indicating whether the first communication session was completed within the predetermined time period.

In another exemplary embodiment of the present disclosure, a method for implementing a cellular network readiness check is provided. The method includes communicating a first push notification from a push notification server to a first mobile terminating device in response to a request to determine a status of the first mobile terminating device and receiving a network connection status from the first mobile terminating device, where the network connection status indicates a readiness of the first mobile terminating device to receive a communication from a first mobile originating device. The method further includes communicating a second push notification from the push notification server in response to a first request to distribute a message expectation push to the first mobile terminating device. The method further includes receiving an indication is received from the first mobile originating device to initiate a first communication session with the first mobile terminating device to initiate a first communication session with the first mobile terminating device and initiating the first communication session from the first mobile originating device to the first mobile terminating device. The method also includes receiving a communication from the first mobile terminating device indicating whether the first communication session was completed within the predetermined time period.

In yet another exemplary embodiment of the present disclosure, one or more computer-readable media having computer-executable instructions embodied thereon that, when executed, perform a method for implementing a cellular network readiness check. The method includes communicating a first push notification from a push notification server to a first mobile terminating device in response to a request to determine a status of the first mobile terminating device and receiving a network connection status from the first mobile terminating device, where the network connection status indicates a readiness of the first mobile terminating device to receive a communication from a first mobile originating device. The method further includes communicating a second push notification from the push notification server in response to a first request to distribute a message expectation push to the first mobile terminating device. The method further includes receiving an indication is received from the first mobile originating device to initiate a first communication session with the first mobile terminating device to initiate a first communication session with the first mobile terminating device and initiating the first communication session from the first mobile originating device to the first mobile terminating device. The method also includes receiving a communication from the first mobile terminating device indicating whether the first communication session was completed within the predetermined time period.

Referring to the figures in general, and initially to FIG. 1, an exemplary computing environment 100 suitable for practicing embodiments of the present disclosure is illustrated. The computing environment 100 may be an example and is not intended to suggest any limitation to the scope of use or functionality of the embodiments discussed herein. Neither should the computing environment 100 be interpreted as having any dependency or requirement relating to any one or a combination of components illustrated in FIG. 1. It should be noted that although some components in FIG. 1 are shown in singular, they may be plural. For example, the computing environment 100 may include multiple processors and/or multiple radios. As shown in FIG. 1, the computing environment 100 includes a bus 102 that directly or indirectly couples various components together, including a memory 104, one or more processor(s) 106, one or more presentation component(s) 108 (if applicable), radio(s) 116, input/output (I/O) port(s) 110, input/output (I/O) component(s) 112, and a power supply 114. More or fewer components are possible and contemplated, including in consolidated or distributed form.

The memory 104 may include memory components described herein. Thus, further elaboration will not be provided here, but it should be noted that the memory 104 may include any type of tangible medium, such as a database, that is capable of storing information. The database may include collection of records, data, and/or information. In one embodiment, the memory 104 may include a set of embodied computer-executable instructions that, when executed, facilitate various functions or elements disclosed herein. These embodied instructions will variously be referred to, in short, as "instructions" or an "application". The processor(s) 106 may be implemented as multiple processors that receive instructions and process them accordingly. The presentation component(s) 108 may include a display, a speaker, and/or other components that may present information (for example, a screen, a light emitting diode (LED) lamp, a graphical user interface (GUI), and/or lighted keyboards) through visual, auditory, and/or other tactile cues.

The radio(s) 116 may facilitate communication with a network and may additionally or alternatively facilitate other types of wireless communications, such as wireless fidelity (Wi-Fi), worldwide interoperability for microwave access (WiMAX), long term evolution (LTE), and/or other voice over internet protocol (VOIP) communications. In various embodiments, the radio(s) 116 may be configured to support multiple technologies, and/or multiple radios may be configured and utilized to support multiple technologies.

The input/output (I/O) port(s) 110 may take a variety of forms. In an example, the I/O port(s) 110 may include a universal serial bus (USB) jack, a stereo jack, an infrared port, a firewire port, other proprietary communications ports, and the like. The Input/output (I/O) components 112 may include keyboards, microphones, speakers, touchscreens, and/or any other item usable to directly or indirectly input data into the computing environment 100.

The power supply 114 may include batteries, fuel cells, and/or any other component that may act as a power source to supply power to the computing environment 100 or to other network components, through one or more electrical connections or couplings. The power supply 114 may be configured to selectively supply power to different components independently and/or concurrently.

Figure 2:
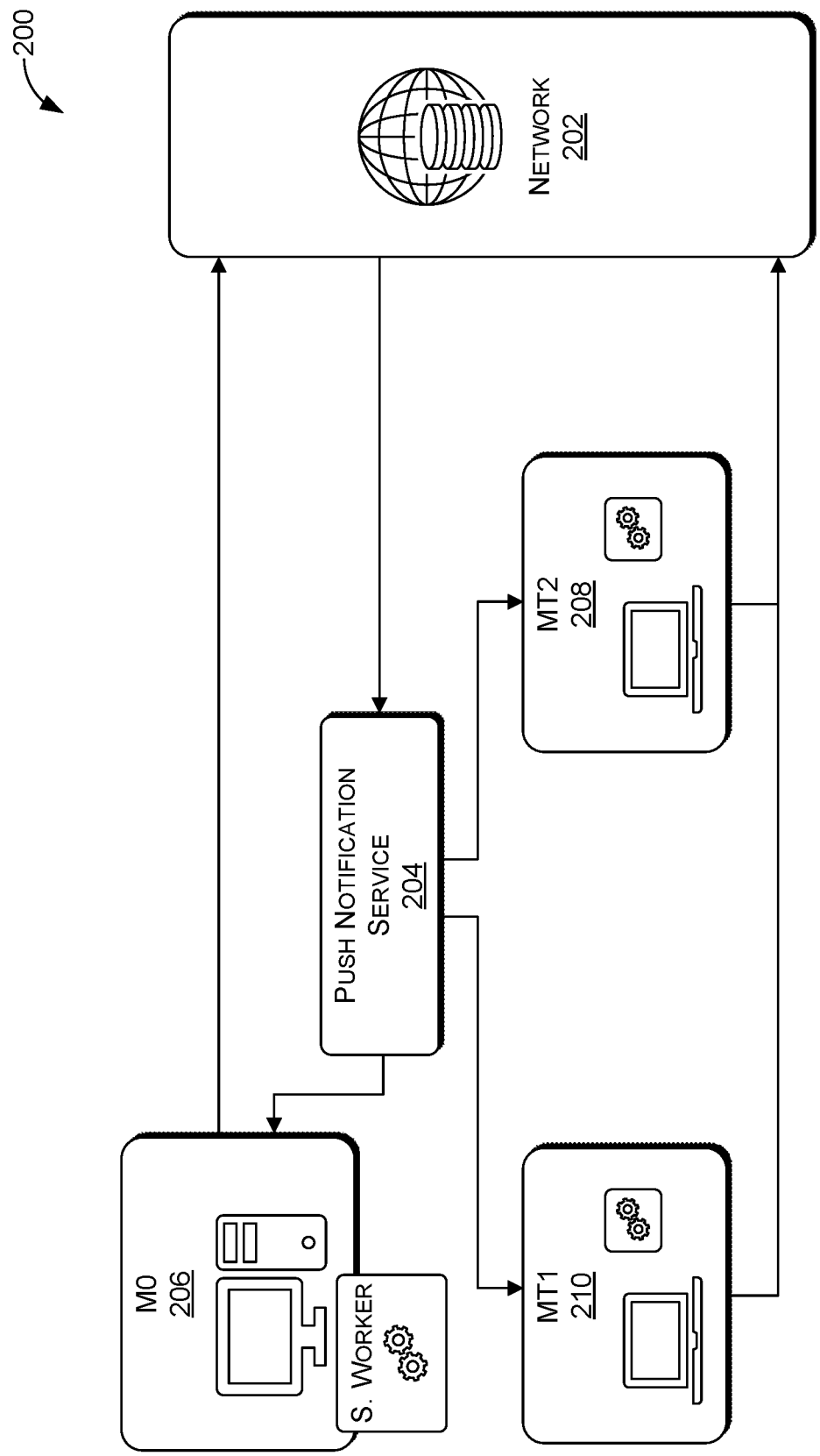
FIG. 2 illustrates an exemplary network environment, in accordance with an embodiment of the present disclosure.

FIG. 2 provides an exemplary network environment 200 in which implementations of the present disclosure may be employed. Such a network environment is illustrated and designated generally as the network environment 200. The network environment 200 may be a suitable network environment and is not intended to suggest any limitation to the scope of use or functionality of the present disclosure. Neither should the network environment 200 be interpreted as having any dependency or requirement relating to any one or combination of components illustrated in FIG. 2.

The network environment 200 includes a network 202, a push notification service 204, a mobile originating device (MO) 206, one or more mobile terminating device (MT) (for example, mobile terminating devices 208 and 210; indicated as MT2 and MT1 respectively in FIG. 2). In the network environment 200, devices may be embodied as a personal computer (PC), a user device, a smart phone, a smart watch, a laptop computer, a mobile phone, a mobile device, a tablet computer, a wearable computer, a personal digital assistant (PDA), a server, a compact disk (CD) player, an moving picture experts group (mpeg)-1 audio layer III or mpeg-2 audio layer III (MP3) player, a global positioning system (GPS) device, a video player, a handheld communications device, a workstation, a router, an access point, or any combination of these delineated devices, or any other device that communicates via wireless communications with a cell site (not shown) in order to interact with a public or private network.

In some aspects, the mobile originating device (MO) 206 corresponds to a computing device (alternatively referred to as the computing environment 100 in FIG. 1). Thus, a user device may include, for example, a display(s), a power source(s) (for example, a battery), a data store(s), a speaker(s), the memory 104, a buffer(s), the radio(s) 116 and the like. In some implementations, the MO 206 includes a wireless or mobile device with which a wireless telecommunication network(s) may be utilized for communication (for example, voice and/or data communication). In this regard, the user device may be any mobile computing device that communicates by way of a wireless network, for example, a 3G, 4G, 5G, LTE, CDMA, or any other type of network.

In some cases, the MO 206 in the network environment 200 may optionally utilize the network 202 to communicate with other computing devices (for example, a mobile device(s), a server(s), a personal computer(s), etc.) through the cell site. The network 202 may be a telecommunications network(s), or a portion thereof. A telecommunications network may include an array of devices or components (for example, one or more base stations), some of which are not shown. Those devices or components may form network environments similar to what is shown in FIG. 2, and may also perform methods in accordance with the present disclosure. The components such as terminals, links, and nodes (as well as other components) may provide connectivity in various implementations. The network 202 may include multiple networks, as well as being a network of networks, but is shown in more simple form so as to not obscure other aspects of the present disclosure.

In some aspects, the mobile terminating devices 208 and 210 correspond to the computing device 100 in FIG. 1. Thus, the user device may include, for example, a display(s), a power supply 114 (for example, a battery), a data store(s), a speaker(s), the memory 104, a buffer(s), the radio(s) 116 and the like. In some implementations, the mobile terminating devices 208 and 210 include a wireless or mobile device with which the wireless telecommunication network(s) may be utilized for communication (for example, voice and/or data communication). In this regard, the user device may be any mobile computing device that communicates by way of a wireless network, for example, a 3G, 4G, 5G, LTE, CDMA, or any other type of network.

In some cases, the mobile terminating devices 208 and 210 in the network environment 200 may optionally utilize the network 202 to communicate with other computing devices (for example, a mobile device(s), a server(s), a personal computer(s), etc.) through the cell site.

The network 202 may be part of a telecommunication network that connects subscribers to their service provider. In some aspects, the service provider may be a telecommunications service provider, an internet service provider, or any other similar service provider that provides at least one of voice telecommunications and data services to any or all of the devices (for example, the mobile originating device 206 and the mobile terminating devices 208, and 210). For example, the network 202 may be associated with a telecommunications provider that provides services (for example, LTE) to the mobile terminating devices 208 and 210. Additionally or alternatively, the network 202 may provide voice, short message service (SMS), and/or data services to user devices or corresponding users that are registered or subscribed to utilize the services provided by the telecommunications provider. The network 202 may include any communication network providing the voice, the SMS, and/or data service(s), using any one or more communication protocols, such as a 1xcircuit voice, a 3G network (for example, CDMA, CDMA2000, wideband code division multiple access (WCDMA), GSM, universal mobile telecommunications system (UMTS)), a 4G network (WiMAX, LTE, high speed downlink packet access (HSDPA)), or a 5G network. The network 202 may also be, in whole or in part, or have characteristics of, a self-optimizing network.

In some implementations, the network 202 is configured to communicate via one or more cell sites (not shown for clarity in the figures). The cell site may be configured to communicate with the devices (for example the mobile originating device 206 and the mobile terminating devices 208, 210) that are located within a geographical area defined by a transmission range and/or receiving range of radio antennas of the cell site. The geographical area may be referred to as the "coverage area" of the cell site or simply the "cell," as used interchangeably hereinafter. The cell site may include one or more base stations, base transmitter stations, radios, antennas, antenna arrays, power amplifiers, transmitters/receivers, digital signal processors, control electronics, GPS equipment, and the like. In particular, the cell site may be configured to wirelessly communicate with devices within a defined and limited geographical area. For the purposes of the present disclosure, it may be assumed that it is undesirable and unintended by the network 202 that the cell site provide wireless connectivity to the devices, such as the mobile originating device 206 and the mobile terminating devices 208 and 210, are geographically situated outside of the cell associated with the cell site.

The push notification service 204 may perform operations related to generating push notifications and promulgating these push notifications to the devices, clients and/or users. In some embodiments, the push notification service 204 may be implemented as one or more software (code) modules executing on suitable computer hardware, such as a server. In some aspects, the push notification service 204 may be physically or logically distinct from other servers that perform operations related to other aspects of the network environment 200.

The push notification service 204 may be capable of detecting or receiving a request to generate a push notification. In some embodiments, requests may be detected based on information sent to the push notification service 204 by other servers or devices associated with the network environment 200. For example, a communication device, such as the mobile originating device 206, may communicate with the push notification service 204 to provide a request to generate the push notification.

The push notification service 204 may generate a push notification message and a push notification record based on the push notification request and store the push notification record in a data store, which may be implemented, for example, using a database or any other data storage technology and a suitable computer-readable storage medium. The push notification record may include a row in a database table, or any structured data object, that represents event information in a manner that makes a particular push notification readily retrievable by the push notification service 204 in response to a request from the device or the client.

The push notification service 204 may also promulgate push notification messages to the devices, the clients, and/or users via various channels to inform the clients and/or the users of the request. In some embodiments, the push notification service 204 generates a message corresponding to notification record and adds message to a message queue. The message may, but need not, contain an actual information in a push notification record. In some embodiments, the message may simply indicate an existence of the push notification record and provide information usable to route message to the client and to allow a receiving device, such the mobile terminating device 208, 210 or the mobile terminating device 210, to retrieve the push notification record from the data store. For example, message may include an identifier of the user for whom the message is intended and an identifier of the record.

Delivery of the push notification message to the client may be accomplished in a client-specific manner using the push notification service 204. The push notification service 204 may read messages from a message queue and may generate appropriate device-specific notification messages; the notification messages may be sent via a channel (for example, a notification service) appropriate to a specific device. In some embodiments, the push-notification service 204 may leverage a service associated with a particular device's operating system (for example, Apple Push Notification Service, operated by Apple Inc., which supports third-party push notifications to devices running Apple's iOS operating system; Google Cloud Messaging, operated by Google Inc., which supports the third-party push notifications to devices running an Android operating system).

In response to receiving the push notification message, the receiving device may request a corresponding push notification record from a notification data store, for example, by sending a request to the push notification service 204, using information contained in a received client-specific message to identify the push notification record of interest.

Figure 3:
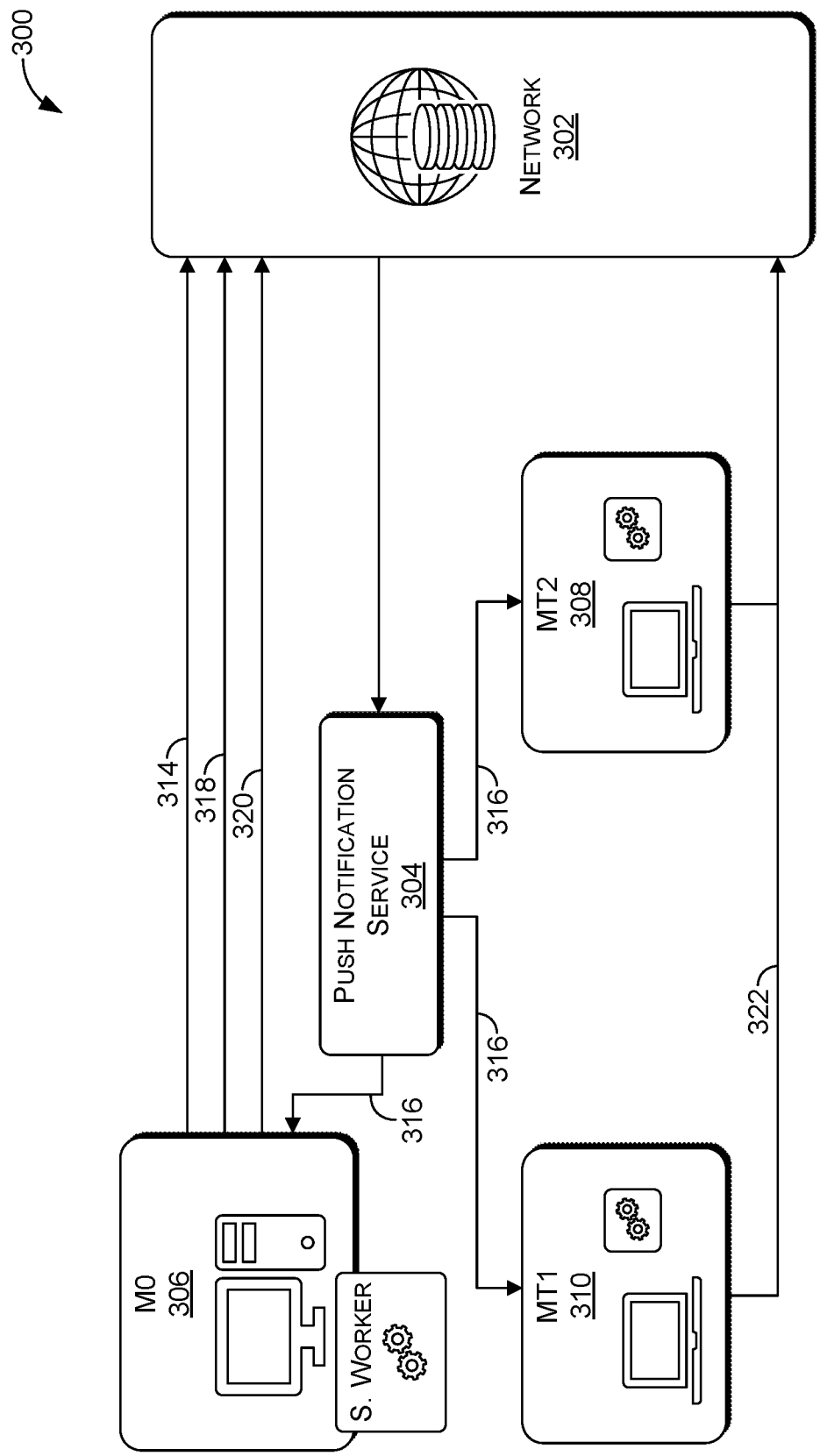
FIG. 3 illustrates an exemplary network environment, in accordance with an embodiment of the present disclosure.

Turning now to FIG. 3, an exemplary system 300 for establishing a two-way cellular network readiness check between a mobile originating device and a mobile terminating device is illustrated. At a high level, the exemplary system 300 includes a network 302, a push notification service 304, the mobile originating device (MO) 306, one or more mobile terminating device (MT) for example, mobile terminating devices 308, and 310, referenced as MT2 and MT1 respectively in FIG. 3). As will be described in relation to FIG. 3, the push notification service 304 may be used in connection with the MO 306 to verify that the mobile terminating devices 308 and 310 are ready and able to participate in a test case. Additionally, the MO 306 and MTs 308, 310 need to maintain communication with each other to exchange information about the test case. FIG. 3 depicts a technological solution where the MO 306 and MTs 308, 310 subscribe to the push notification service 304 when they first start up. Using the push notification service 304, the functional end-to-end test framework creates the two-way communication channel between the MO and all MTs.

During a test run, the MTs 308, 310 are launched first. The MTs 308, 310 contact the network 302, which authenticates the MTs 308, 310. When the MO 306 is launched, the MO 306 contacts the network 302 which authenticates the MO 306. To protect user data security and integrity, the network 302 may provide a security key to the MTs 308, 310 and the MO 306 for authentication and identity checking. For example, the network 302 may assign the push notification service 304 with a security key that may be used when the push notification service 304 is contacted or used to generate and distribute push notifications to a mobile or other device. In such embodiments, the MTs 308, 310 and the MO 306 will need the security key (or security keys) from the network 302 to access the push notification service 304 and to subscribe to the push notification service 304. The MTs 308, 310 and the MO 306 then contacts the push notification service 304 and subscribes to receive the push notifications from the push notification service 304. The device operating as the MO 306 may operate as an MO or as an MT.

The device operating as the MO 306 then launches a test engine which operates on a server associated with the MO 306. The MO 306 sends an initial request 314 to the network 302. The initial request 314 sent by the MO 306 to the network 302 is a request to determine which devices operating as MTs are available to participate in the test run. The initial request 314 to the network 302 to determine availability and readiness of the MTs 308, 310 initiates a protocol which determines which MTs of all the subscribed MTs 308, 310 are connected to the network 302.

The network 302 then communicates the initial request 314 to the push notification service 304. The push notification service 304 will generate a push notification message and a push notification record based on the push notification request and stores the push notification record in a data store. The push notification message is to be communicated to the MO 306 and the MTs 308, 310 subscribed to the push notification service 304. In some instances, there may be one or more MOs subscribed to the push notification service 304. Additionally, there may be one or more MTs subscribed to the push notification service 304. The push notification service 304 distributes a push notification 316 to all subscribed clients, such as the MTs 308, 310. The devices or the clients that are acting as the MT's 308, 310 accept this notification.

In response to the push notification message requesting the availability and readiness of the MTs 308, 310, the devices operating as the MT's 308, 310 communicate their identity and a status communication 322 to the network 302. The communication from the MTs 308, 310 to the network 302 may be done using a variety of communication pathways. For example, the MTs 308, 310 may communicate their status and identities to the network 302 using a standard routable representational state transfer application programming interface (REST API) message. The MO 306 client ignores the request 316 from the push notification service 304 and instead waits for the status communication 322 to be communicated to the server. The network 302 receives the status communication 322 and identity from all the MTs 308, 310. The status communication 322 indicates the MT's 308 and 310 ability to participate in the test case. To be indicated as available to participate in the test case, the MTs 308, 310 must be connected to the network 302. The network 302 communicates the status communication 322 and identity message from the MTs 308, 310 to the push notification service 304. The network 302 then communicates the status communication 322 to the push notification service 304. The push notification service 304 will generate the push notification message and the push notification record based on the status communication 322 and stores the push notification record in the data store. The push notification message will then be communicated to the MO 306 and the MTs 308, 310 which are subscribed to the push notification service 304. The MO 306 receives the push notification service 304 with all the MTs' status and starts executing the test case. The MTs 308, 310 ignore this push as it is directed at the MO 306. The MO 306 assigns the first MT 308 as MT1, the second MT 310 as MT2. If a third MT is present, the MO 306 will assign that MT as MT3 up to MTN for N number of devices present and ready to participate in the test case.

The MO 306 sends the REST API message containing an expectation message 318 for the MT1 to the network 302 and each of the other MTs connected and ready to participate in the test case. Each test case executed has a unique ID that is used to correlate the test cases. The expectation message 318 contains what an expected outcome of the test case for the MT1 308 is. For example, the expectation message 318 may also contain information regarding the timing of the communication session request from the MO 306 to the MT1 308. Such communication sessions may be a call over a wireless network, a text message, or other communication between the MO 306 and the MT1 308.

The network 302 then communicates the expectation message 318 to the push notification service 304. The push notification service 304 will generate the push notification message and the push notification record based on the expectation message 318 and stores the push notification record in the data store. The push notification message is to be communicated to the MT1 308. The MT 308 or MT1 accepts an incoming call expectation push notification. In response to the expectation push notification, the MT1 308 starts a timer and waits for an incoming communication session request such as a communication session request 320. The MO 306 requests to initiate the communication session request 320 with the MT1 308. This communication session request 320 may use a cellular network which may be the network 302. The communication session request 320 may also be through any other communication avenue such as a hard wired communication network.

If the MT 308 or the MT1 device receives the communication session request 320 within a pre-determined time, the test case is considered as a "PASS". If the MT 308 or the MT1 device receives the communication session request 320 within a pre-determined delayed time, the test case is not considered a pass but reports to the network 302 about the delay. If the MT 308 or the MT1 device does not receive the communication session request 320 before the pre-determined times expires, the test case is considered a "FAIL".

Once the success of the communication session request 320 is determined, the MT 308 or the MT1 device sends a report to the network 302. The report sent to the network 302 contains whether the communication session request 320 is pass, fail, or was delayed along with the test case ID. The network 302 then communicates the success report to the push notification service 304. The push notification service 304 will generate the push notification message and the push notification record based on the expectation message 318 and stores the push notification record in a data store. The push notification message is to be communicated to the MO 306. When the MO 306 receives a success report push notification, it indicates an outcome of the test case with the outcome of the communication session request 320. A success report which indicates anything other than a pass may create an indication to send the report to a log and create a trouble ticket. The trouble ticket indicates that there may exist a problem within the communication pathways between the MO 306 and the MT 308.

Figure 4:
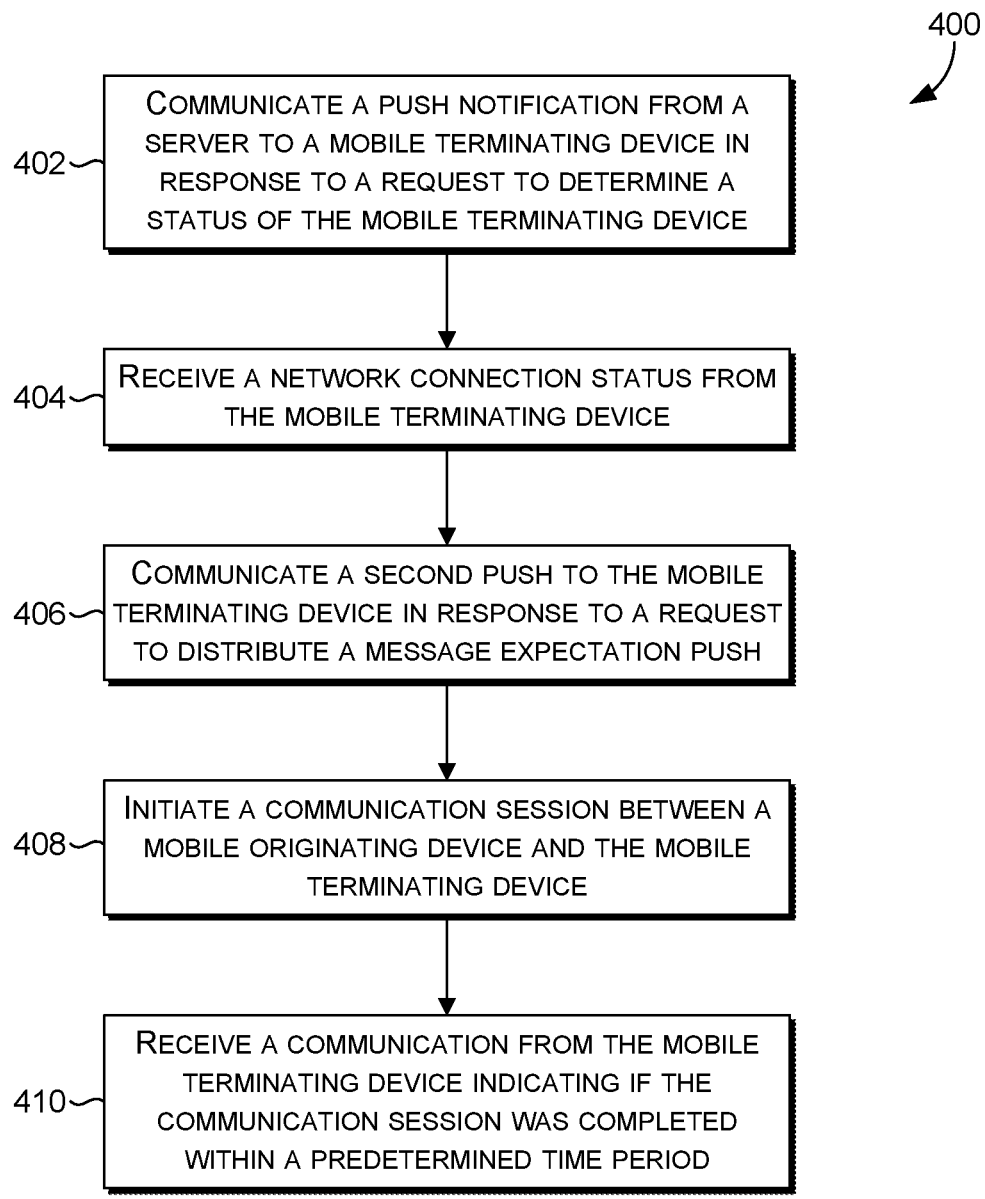
FIG. 4 illustrates a flowchart of an exemplary method, in accordance with an embodiment of the present disclosure.

Turning now to FIG. 4, a flowchart of an exemplary method 400 for implementing a wireless or cellular network readiness check is illustrated. At step 402, the method 400 includes communicating of a push notification from a server to a mobile terminating device (such as the MT) in response to a request to determine a status of the mobile terminating device. The push notification of step 402 may be generated by the push notification service 304 (shown in FIG. 3). At a second step 404, a network connection status is received from a first mobile terminating device (such as the MT 308 shown in FIG. 3). In a third step 406, a second push notification is communicated to the mobile terminating device in response to a request to distribute a message expectation push. The message expectation push may contain information related to a test case initiated by the mobile originating device (such as the MO 306 shown in FIG. 3). Such information may include pre-determined timing limits of the communication session request 320. For example, if the communication session request 320 is completed between the MO and the first MT within a first time period, the test is considered a pass. If the communication session request is completed within a second, longer time period, the session is considered delayed. If the communication session request is not completed within any time period specified, the communication session request is considered to be failed. In a fourth step 408, a communication session is initiated between the mobile originating device 306 and the mobile terminating device 308 or 310. In a fifth step 410, a communication from the mobile terminating device 308, 310 is received indicating whether the communication session was completed within the predetermined time periods discussed above. Each of the above steps may be repeated for one or more MTs connected to the network 302.

Many different arrangements of the various components depicted, as well as components not shown, are possible without departing from the scope of the claims below. Embodiments of the present disclosure have been described with an intent to be illustrative rather than be restrictive. Alternative embodiments will become apparent to readers of the present disclosure. Alternative means of implementing the aforementioned aspects may be completed without departing from the scope of the claims below. Certain features and sub-combinations of aspects of the present disclosure are of utility and may be employed without reference to other features and sub-combinations and are contemplated within the scope of the claims.

What is claimed is:

1. A method for implementing a cellular network readiness check, the method comprising:
    communicating a first push notification from a push notification server in response to a request to determine a status of a first mobile terminating device to the first mobile terminating device and a first mobile originating device;
    receiving a network connection status from the first mobile terminating device, the status indicating a readiness of the first mobile terminating device to receive communication from the first mobile originating device;
    communicating a second push notification from the push notification server to the first mobile terminating device and the first mobile originating device in response to the receiving the network connection status from the first mobile terminating device, the second push notification comprising the network connection status;
    receiving from the first mobile originating device, a first request to distribute a message expectation push to the first mobile terminating device;
    communicating a third push notification from the push notification server in response to the first request to distribute the message expectation push to the first mobile terminating device and the first mobile originating device;
    receiving an indication from the first mobile originating device to initiate a first communication session with the first mobile terminating device;
    initiating the first communication session from the first mobile originating device to the first mobile terminating device; and
    receiving a first communication from the first mobile terminating device indicating if the first communication session was completed within a predetermined time period.

2. The method of claim 1, wherein the request to determine the status of the first mobile terminating device is received from the first mobile originating device.

3. The method of claim 2, wherein the request to determine the status of the first mobile terminating device is received by way of an application programming interface.

4. The method of claim 1 further comprising:
    upon receiving the third push notification, initiating, by the first mobile terminating device, a second communication to determine whether the first communication session was successful.

5. The method of claim 4, wherein upon completion of an allotted time specified on a timer and the first communication session is not received by the first mobile terminating device, the first communication session is indicated as not successful.

6. The method of claim 4, wherein upon completion of an allotted time specified on a timer and the first communication session is received by the first mobile terminating device, the first communication session is indicated as successful.

7. The method of claim 1, wherein following the communication of the first push notification, an identification of the first mobile terminating device is received by the push notification server.

8. The method of claim 1, further comprising:
communicating, to the first mobile originating device, a status push notification in response to a receipt of the status of the first mobile terminating device.

9. The method of claim 1, further comprising:
distributing a fourth push notification generated at the push notification server in response to a second request to distribute a second incoming message expectation push to a second mobile terminating device;
initiating a second communication session request from the first mobile originating device to the second mobile terminating device; and
receiving a third communication from the second mobile terminating device indicating whether the second communication session request was successful.

10. One or more computer-readable media having computer-executable instructions embodied thereon that, when executed, perform a method for implementing a cellular network readiness check, the method comprising:
communicating a first push notification from a push notification server to a first mobile terminating device in response to a request to determine a status of the first mobile terminating device;
receiving a network connection status from the first mobile terminating device, the network connection status indicating a readiness of the first mobile terminating device to receive a communication from a first mobile originating device;
communicating a second push notification from the push notification server to the first mobile terminating device and the first mobile originating device in response to the receiving the network connection status from the first mobile terminating device, the second push notification comprising the network connection status;
receiving from the first mobile originating device, a first request to distribute a message expectation push to the first mobile terminating device;
communicating a third push notification from the push notification server in response to the first request to distribute the message expectation push to the first mobile terminating device;
receiving an indication from the first mobile originating device to initiate a first communication session with the first mobile terminating device;
initiating the first communication session from the first mobile originating device to the first mobile terminating device; and
receiving a first communication from the first mobile terminating device indicating whether the first communication session was completed within a predetermined time period.

11. The one or more computer-readable media of claim 10, wherein the request to determine the status of the first mobile terminating device is received from the first mobile originating device.

12. The one or more computer-readable media of claim 11, wherein the request to determine the status of the first mobile terminating device is received by way of an application programming interface.

13. The one or more computer-readable media of claim 10, wherein:
upon receiving the third push notification, the first mobile terminating device initiates a protocol to determine whether the first communication session was successful.

14. The one or more computer-readable media of claim 13, wherein the protocol comprises a timer configured to start upon receipt of the first communication session.

15. The one or more computer-readable media of claim 14, wherein upon completion of an allotted time specified on the timer and the first communication session not being received by the first mobile terminating device, the first communication session is indicated as not successful.

16. The one or more computer-readable media of claim 15, wherein upon receiving an indication that the first communication session was not successful, creating a trouble ticket, the trouble ticket indicating that a problem exists in a communication pathway between the first mobile originating device and the first mobile terminating device.

17. The one or more computer-readable media of claim 16, wherein upon completion of the allotted time specified on the timer and the first communication session being received by the first mobile terminating device, the first communication session is indicated as successful.

18. The one or more computer-readable media of claim 10, wherein following the communication of the first push notification, an identification of each of the first mobile terminating device and a second mobile terminating device is received.

19. A system for implementing a cellular network readiness check comprising:
one or more computer components configured to:
communicate a first push notification from a push notification server to a first mobile terminating device in response to a request to determine a status of the first mobile terminating device;
receive a network connection status from the first mobile terminating device, the network connection status indicating a readiness of the first mobile terminating device to receive a communication from a first mobile originating device;
communicate a second push notification from the push notification server to the first mobile terminating device and the first mobile originating device in response to the receiving the network connection status from the first mobile terminating device, the second push notification comprising the network connection status;
receive from the first mobile originating device, a first request to distribute a message expectation push to the first mobile terminating device;
communicate a third push notification from the push notification server in response to the first request to distribute the message expectation push to the first mobile terminating device;
receive an indication from the first mobile originating device to initiate a first communication session with the first mobile terminating device;
initiate the first communication session from the first mobile originating device to the first mobile terminating device; and
receive a first communication from the first mobile terminating device indicating whether the first communication session was completed within a predetermined time period.

20. The system of claim 19, wherein following the communication of the first push notification, an identification of each of the first mobile terminating device and a second mobile terminating device is received.

* * * * *